United States Patent
Frank et al.

(12) 
(10) Patent No.: US 6,671,513 B1
(45) Date of Patent: Dec. 30, 2003

(54) PROCEDURE IN A MOBILE TELEPHONE SYSTEM TO TRANSMIT POSITION SPECIFICATIONS

(75) Inventors: Robert Frank, Stockholm (SE); Mats Olof Winroth, Poing (DE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/623,599

(22) PCT Filed: Feb. 25, 1999

(86) PCT No.: PCT/SE99/00269

§ 371 (c)(1), (2), (4) Date: Jan. 12, 2001

(87) PCT Pub. No.: WO99/45725

PCT Pub. Date: Sep. 10, 1999

(30) Foreign Application Priority Data

Mar. 3, 1998 (SE) ................................................ 9800652

(51) Int. Cl.⁷ ................................................. H04Q 7/20
(52) U.S. Cl. ........................ 455/456; 455/404; 455/466
(58) Field of Search ................................ 455/404, 456, 455/457, 466, 558; 342/357.09, 457

(56) References Cited

U.S. PATENT DOCUMENTS

| | | | | |
|---|---|---|---|---|
| 5,687,215 A | * | 11/1997 | Timm et al. | 379/58 |
| 5,937,355 A | * | 8/1999 | Joong et al. | 455/466 |
| 6,014,568 A | * | 1/2000 | Alperovich et al. | 455/456 |

FOREIGN PATENT DOCUMENTS

| | | |
|---|---|---|
| EP | 0 647 076 | 4/1995 |
| FR | 2 755 567 | 5/1998 |
| WO | WO 96/42179 | 12/1996 |

* cited by examiner

*Primary Examiner*—Lee Nguyen
(74) *Attorney, Agent, or Firm*—Oblon, Spivak, McClelland, Maier & Neustadt, P.C.

(57) ABSTRACT

A system and associated method of providing position specifications of a mobile telephone station is provided. A position specification is provided to a mobile station via a cell level general cell broadcast. When a specific telephone call is made from the mobile station to a center, the specific call will trigger the transmission of the position specification collected via the cell broadcast (CB). The position specification is transmitted from the mobile station via a short text message (SMS) to the center.

5 Claims, No Drawings

PROCEDURE IN A MOBILE TELEPHONE SYSTEM TO TRANSMIT POSITION SPECIFICATIONS

FIELD OF THE INVENTION

The present invention relates to a procedure to transmit a position specification, especially at emergency call from a mobile telephone in a mobile telecommunications system to an emergency centre. The position of the mobile is found out by the system and is transmitted to a mobile station for storing. When an emergency call is made from the mobile station, a position specification is transmitted automatically by a separate message to the emergency centre. In the emergency centre the message with the position specification is routed to the same terminal that receives the telephone call. This is possible owing to that both the telephone call and the message with the position specification includes information about the number of the mobile station.

PRIOR ART

At emergency calls today, the calling party has to specify his/her position himself/herself. The calling party often can be confused due to the emergency, and also in many cases knows little about the locality.

In the present invention a position specification is transmitted automatically to the emergency centre without the calling party doing nothing but keying the alarm number. This of course is a great help for the staff at the emergency centre who quickly can localize the calling distressed person and for instance pick up the right map.

SUMMARY OF THE INVENTION

Thus the present invention provides a procedure to transmit position specifications in mobile telephone systems which have base stations and mobile stations.

According to the invention, a position specification is transmitted to a mobile station which stores the position specification. When a certain telephone call is made from the mobile to a centre which has a receiving terminal, this will trigger off that the position specification is collected and transmitted in a separate message to the centre.

The invention is specified in detail in enclosed patent claims.

DETAILED DESCRIPTION OF THE PREFERRED EMBODIMENTS

At call to an emergency centre it is important to quickly get the position where the accident or the crime has occurred. Often a user can find it difficult to tell where he/she is due to poor knowledge of the locality, or due to confusion.

To know the position might help the staff at the emergency centre to, together with questioning the calling party, find out exactly from where the call is coming.

With mobile telephony the rescue service has considerably better prospects of being on the spot in time; by position the task would be even simpler.

According to a preferred embodiment of the invention, a position specification is transmitted on cell level via CBS (Cell Broadcast Service), and is routed down to an application on the SIM-card (Subscriber Identity Module). When the emergency number "112" is keyed, the position is at the same time transmitted via short text message, SMS (Short Message Service) to the emergency centre. In the emergency centre one can via A-number analysis route the SMS-message to the same person (terminal) as has received the call. On basis of the position, the operator (or the equipment automatically) can pick up a map over the locality in question. Often a cell is large, but the help can in spite of that gain some valuable minute by giving the operator at the emergency centre a fairly restricted area to search.

As alternative to SMS, also USSD (Unstructured Supplementary Services Data) or UUS (User-to-User Signalling) can be used to transfer the position information to the emergency centre. USSD has similar qualities as SMS. USS, on the other hand, is transmitted directly in the "SET UP"-message in the ISUP-signalling. This means that when the emergency operator answers, the position specification already is there. The advantage of UUS consequently is that the message reaches the operator quicker and is more reliable. It, however, implies that the emergency centre is equipped with telephone equipment with ISDN-technology (Integrated Services Digital Network).

The technology which makes the function possible is based on the following:

CBS: A CB-message with cell position specification can be routed directly to the SIM-card.

SIM Toolkit and SMS: One of the functions supported by the application platform SIM Toolkit is call control, which i.a. has the quality that all telephone numbers which are keyed have to pass the SIM-card. SIM Toolkit allows that fairly advanced applications are implemented on the card itself. In this case, the SIM Toolkit application shall react to the string "112" by transmitting an SMS with the position specification, and forward "112" to the telephone, which establishes a call to the emergency centre.

Consequently the procedure according to the invention includes the steps that:

the cell position is delivered to the mobile via a CBS-message which is routed to the SIM-card. This means that all base stations have to transmit position specification. This, however, can be used for many services, so the message is not only used for emergency calls.

SIM Toolkit's function "Call control", where all keyed numbers pass the SIM-card is used to start an application when "112" is keyed.

SIM Toolkit's function "Proactive SIM", which i.a. allows that the SIM-card can transmit an SMS-message, is used to transfer the received position to the emergency centre.

the SMS-message with position is, by means of A-number analysis, routed to the operator who has received the emergency call. USSD or UUS also can serve as carrier of the position data.

The invention consequently improves the efficiency at emergency calls, because the position is transmitted to the emergency centre at the same time as the emergency call is going on.

What is claimed is:

1. A method to transmit position specification in a mobile telephone system including base stations and mobile stations, comprising the steps of:

transmitting a position specification to a mobile station which stores the position specification, the position specification being transmitted out on cell level via a general (cell broadcast; CB) message;

making a specific telephone call from the mobile station to a center which has a receiving terminal;

triggering the transmission of the position specification collected in a separate message to the center upon making the specific telephone call;

transmitting the position specification via short text message (SMS) to the center, which by A-number-analysis identify where to route the SMS-message and verbal contact is connected to the same operator in the center, and the operator identifies the area from which the mobile station calls.

2. The method of claim 1, wherein the telephone call and the message both include information about the subscriber number of the mobile station, so that the message is routed to the same receiving terminal.

3. The method of claim 1, wherein the position specification is stored in an application on the mobile station's subscriber card (SIM).

4. The method of claim 1, wherein the message is of the type short text message (SMS) or USSD (Unstructured Supplementary Services Data) or UUS (User-to-User Signalling).

5. The method of claim 1, wherein the telephone call is an emergency call, and the center is an emergency center.

* * * * *